United States Patent [19]

Jerpbak

[11] 4,133,460
[45] Jan. 9, 1979

[54] APPARATUS EMBODYING EXPLOSIVELY REMOVABLE SLEEVE

[76] Inventor: Jeffery P. Jerpbak, 506 Falls Rd., Chagrin Falls, Ohio 44022

[21] Appl. No.: 653,502

[22] Filed: Jan. 29, 1976

[51] Int. Cl.$^2$ .............................................. B29F 1/02
[52] U.S. Cl. ................................. 222/386; 29/401 F; 138/177; 222/413; 308/237 R; 366/79; 425/192 R
[58] Field of Search ................. 29/401 F, 403, 421 E; 264/176 R, 328, 329; 259/191, 192, 193, 104; 425/204, 207, 208, 190, 191, 192 R, 376, 461, DIG. 15, 247, 242 R, DIG. 227, 542; 198/657, 860; 308/237 R, 238, 239, 240; 222/412, 389, 390, 541, 386, 413; 138/148, 101, 151, 177; 82/18; 220/89 A; 137/68 R, 68 A, 797; 169/75; 102/26, 30; 279/1 N; 188/1 C; 285/4; 366/79

[56] References Cited

U.S. PATENT DOCUMENTS

| | | | |
|---|---|---|---|
| 2,686,335 | 8/1954 | Gross | 425/376 R |
| 2,984,173 | 5/1961 | Roche et al. | 425/376 R X |
| 3,089,230 | 5/1963 | Chapman et al. | 29/421 E X |
| 3,188,152 | 6/1965 | Miller | 308/238 X |
| 3,250,542 | 5/1966 | Winnen et al. | 279/1 N |
| 3,439,586 | 4/1969 | Holtan et al. | 308/237 X |
| 3,529,873 | 9/1970 | Spieth | 308/240 X |
| 3,900,188 | 8/1975 | Seufert | 259/192 |
| 3,910,316 | 10/1975 | Reifenhauser | 259/104 X |

Primary Examiner—Francis S. Husar
Assistant Examiner—Mark Rosenbaum
Attorney, Agent, or Firm—Bosworth, Sessions & McCoy

[57] ABSTRACT

A housing for an elongated opening such as a cylindrical passage which has a portion subject to severe conditions such as abrasion, heat, pressure, wear or corrosion which tend to deteriorate the wall of said opening, has a replaceable sleeve in the opening only at the portion exposed to such severe conditions. The housing, illustrated as a metal barrel for a plastic injection molding apparatus, has an elongated aperture or bore having a cross section larger than the desired cross section of the passage. A metal tubular inner sleeve defining the passage is held in the bore of the housing by a tight fit. The sleeve has at least one groove extending longitudinally on the exterior of the sleeve which forms a cavity with the housing wall. The end of the groove at at least the exposed end of the sleeve is closed by a closure portion or ridge. The sleeve can be removed by drilling a hole through the closure portion to permit access to the groove cavity and permit introduction of explosive material into the cavity. Detonating of the explosive material causes the sleeve to collapse, as by fracture into a plurality of pieces, internally of the bore, permitting the sleeve to be easily removed from the housing bore. A replacement sleeve can then be inserted without machining of the housing of the sleeve. Various types of sleeves, and methods of removing and replacing the sleeve are disclosed.

23 Claims, 16 Drawing Figures

APPARATUS EMBODYING EXPLOSIVELY REMOVABLE SLEEVE

DISCLOSURE OF THE INVENTION

1. Field of the Invention

This invention relates to apparatus embodying a housing having a replaceable sleeve providing an opening that is elongated in that it is of substantial length along the axis of the opening, which opening is subjected to severe conditions such as abrasion, heat, pressure, wear, or corrosion, which sleeve is formed of material resistant to such conditions; and to an explosive method of removing such sleeve.

2. Background of the Invention

While the invention provides advantages in various applications or uses, it provides particular advantages when used in plastic injection molding machines, and therefore will be discussed as used in connection with such machines.

In most known plastic injection molding machines, plastic material, such as synthetic resin material, is fed through a hopper into a metal barrel having a cylindrical passage. The barrel is heated to soften the plastic material or keep it softened, and a screw forces the heated plastic material through an injection nozzle into a mold to obtain the desired shaped plastic products.

During such injection action, the wall of the passage in the barrel near the discharge end of the barrel is subjected to high abrasion pressure, heat, and often corrosion conditions. The screw, which is actuated to force the plastic material through the nozzle, has an end or tip that aids in this action. The movement of the tip and screw results in abrasive action in the wall of the passage near the discharge end of the barrel. In order to force the plastic material fully into the mold, pressures in excess of 20,000 psi often arise near the discharge end of the injection barrel. The barrel is also usually heated to melt or keep molten the material in the passage. The resulting temperature along the passage wall will vary depending upon the properties of the plastic material being used, but temperatures in excess of 350° F. are typical; such heat often causes a chemical reaction between the heated plastic material and the heated wall of the passage. This causes corrosion of the passage wall. As a result of the high abrasion, pressure, heat and possible corrosion, or other deterioration on the interior wall of the passage in the barrel, in injection machine barrels, the zone of greatest wear or other deterioration usually occurs near the discharge end of the passage because of the pressures and abrasion resulting from the injection stroke of the screw tip, the stroke length being usually equivalent to approximately 3 to 5 times the diameter of the passage.

Because of such severe conditions occurring in the passage in the barrel, these barrels or portions of them must be made of special materials. Ordinary grades of steel are not satisfactory. More expensive steel alloys with considerably greater surface hardness have been employed for at least the portions of the injection barrels subjected to such severe conditions. For example, nitrided steel alloys have been found to be an acceptable material for such barrels. A typical nitrided barrel material has a base material of steel alloy adapted for nitriding, such as Nitralloy 135, which is subjected to a standard nitriding case-hardening process to increase abrasion resistance and wear-resistance, retain hardness at high temperatures, and increase resistance to substantial stresses and to corrosion.

Another solution to the problem of barrel wear has been the development of a bimetal barrel. Bimetal barrels have an outer tubular portion of a relatively inexpensive grade of steel, such as SAE 1020, which has internally bonded to it an inner layer providing a passage wall of a considerably more costly material that is exceptionally resistant to the above indicated severe conditions such as abrasion, heat, pressure, wear or corrosion. While bimetal barrels in most cases cost about twice as much as nitrided barrels, in general they have a life of 3 or more times that of nitrided barrels.

A major problem with both nitrided barrels and bimetal barrels is that the interior passage walls eventually wear or otherwise deteriorate sufficiently to render the barrels unusable because of the severe conditions to which they are subjected. The usual solution to this problem has been either to replace the entire barrel or, particularly in the case of the more expensive bimetal barrels, to attempt to repair or replace the inner layer of abrasion resistant material, at least in the zone of greatest wear or other deterioration with a replacement liner. However, replacement methods heretofore used usually require expensive and time-consuming boring to remove hard worn material and prepare the barrel for a replacement liner.

Similar problems have arisen in other apparatus in which an opening or passage in a housing is subject to high abrasion and wear or corrosion. Such conditions often occur in pumps or conduits that conduct highly corrosive or abrasive materials. Here also, problems arise in making possible effective, simple and inexpensive methods and means for providing and removing condition resistant inner liners from the housings.

Various methods of removing inner liners from such housings have been proposed to avoid the necessity of machining to remove liners. Most of these methods employ pressure between the inner liner and the housing, or shock or vibration on the outside of the housing in order to loosen the inner liner. For example, U.S. Pat. No. 1,883,662 discloses a liner for pressure vessels subject to corrosion which liner is stated to be removable by application of hydraulic pressure between the vessel and the liner. A similar method for pump cylinders is disclosed in U.S. Pat. No. 2,832,653. However, such methods and apparatus would be unworkable in molding machine injection barrels because of the high longitudinal shear forces and transverse compressive forces that occur in use of such barrels. Moreover such constructions cost much more than those of the present invention because of the necessity of machining the complex shapes of and of drilling numerous holes in, the housings and liners.

U.S. Pat. No. 3,089,230 discloses a process for separating individual metallic layers of a hollow multi-layered object such as a tube or hemisphere by exploding material on the outside of the object to create shocks or vibrations on the inside of the object. If used in an injection molding machine barrel, however, the necessarily strong shocks would damage the outer housing and distort the internal passage for the screw and thereby cause the screw to jam or break.

U.S. Pat. No. 3,900,188 discloses a screw extruder in which bonding material is used to secure a liner in a housing, and a suitable pressure tool is used to force a worn sleeve out of the housing. If this is possible, it is because the bonding material has much lower resistance to shear forces than the material from which the housing and liner are made. If such structure was used in a barrel of an injection molding operating at high pressures the sleeve could loosen during an injection molding process because of the low resistance to shear forces of the bonding material. If a bonding material is used that will soften or melt under heat, such as the white metal disclosed, it will weaken during an injection process in which the barrel is heated. Also, the use of a pressure tool for removal is quite time-consuming, and provides little advantage over the cutting method of removing the sleeve. Indeed, the use of a pressure tool to remove a liner in this patent, or a cutting tool to remove a liner as in widely used conventional apparatus, is difficult because of the small space available for the tool in the passage from which the liner is to be removed.

All of the structures and procedures of these patents are also undesirably costly and complicated.

SUMMARY OF THE INVENTION

The above and other shortcomings of the prior art are overcome by the unique structure of the present invention which employs in inner sleeve of unique design in an opening of an outer housing, which sleeve is formed of material highly resistant to the severe conditions and which can be easily removed using a novel explosive process.

It is an object of the present invention to provide a housing having an elongated opening the wall of which is resistant to severe conditions such as those discussed above.

Another object is to provide a metal housing having a passage a portion of which is subjected to severe conditions that would deteriorate the wall of that portion of the passage, which housing has an inner sleeve located in only that portion of the passage in the housing to provide a passage wall portion formed of material that is highly resistant to such severe conditions, which sleeve can be quickly, easily and inexpensively removed.

Still another object is to provide a process for removing an inner sleeve from a housing, which process can be readily carried out without damage to the housing.

Yet another object is to provide a removable sleeve which, as after a worn sleeve has been removed, can be readily inserted into an opening of a housing without creating undesirable stresses within the sleeve or housing.

The invention provides, among other features, a housing for an elongated opening that is subject to wear or abrasion, such as the housing of a barrel of an injection molding machine for plastic materials, a portion of the opening in the housing having an elongated aperture of a cross section larger than the cross section of the remainder of the opening; and a tubular sleeve defining a portion of the opening, the sleeve being inserted into and fixed within the aperture of the housing and having at least one groove formed in and extending along the exterior of the sleeve and having a closure portion between an end of the groove and an end of the sleeve accessible from the exterior of the housing portion, the cavity formed by the groove and the wall of the aperture being capable of having an explosive material inserted therein between the sleeve and the housing after a hole has been formed through the closure portion. Preferably there are a plurality of such grooves equally spaced around the sleeve.

To remove the sleeve, as after it is worn, a hole is formed, as by drilling, through the closure portion to provide access to each cavity into which cavity a suitable amount of a suitable explosive material is introduced. The explosive material is then detonated and the sleeve is collapsed, as by being fractured into a plurality of pieces, so the sleeve can be easily removed from the housing without damage to the housing. After removal of the worn sleeve a replacement sleeve may be inserted into the aperture in the housing using a shrink-fitting technique.

The invention also provides a sleeve resistant to severe conditions, which sleeve is adapted to be inserted into an aperture to provide an opening in the sleeve having a wall that resists such conditions, which sleeve is of generally cylindrical configuration and has an external groove therein terminating short of the end portions of the sleeve whereby the end portions of the sleeve have uninterrupted external generally cylindrical configurations. Preferably, indicia means on at least one end of the sleeve indicate the location of the adjacent end of each groove on the sleeve.

DETAILED DESCRIPTION OF THE PREFERRED EMBODIMENTS

Figure 1:
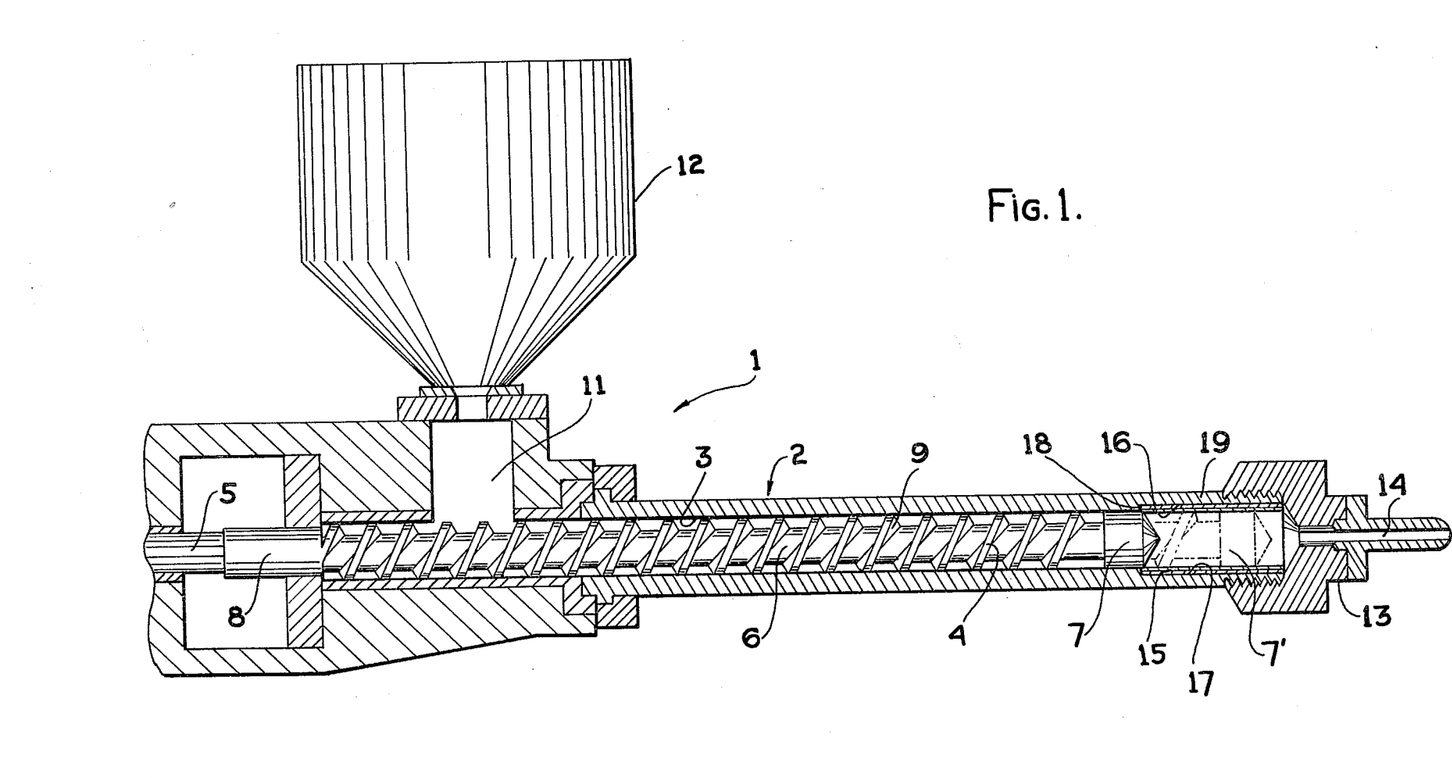
FIG. 1 is a side sectional view showing a portion of a conventional injection molding machine modified to include a housing or barrel embodying the present invention.

FIG. 1 shows a portion of a conventional plastic injection molding machine 1 modified to include the housing or barrel of the present invention. The injection molding machine shown is of the reciprocating screw type, although it is understood that the present invention may be utilized in other types of machines to similar advantages. The machine includes an elongated barrel 2 having an internal elongated cylindrical opening or passage 3. A screw member 4 in passage 3 is both rotatable and axially movable in known manner by a shaft 5 connected to a known means, not shown, including a hydraulic system for reciprocating member 4 and motor means for rotating it. Member 4 comprises a shank 6 of a diameter substantially smaller than that of passage 3, a head portion or tip 7 at the injection end of member 4, a drive portion 8 at the other end of member 4 connected to shaft 5, and a helical vane or flight 9 on shank 6 extending from tip 7 rearward to drive portion 8 and fitting closely in passage 3.

The upstream end of passage 3 communicates with a known input chute 11 and feed hopper 12 through which the plastic or synthetic resin material to be molded is fed into passage 3. This material is in the form of pellets of solid plastic material, such as polyethylene or polyvinyl chloride. The downstream end of passage 3 has a known injection nozzle 13 having passage 14 through which the plastic material passes into the mold cavity, not shown.

Normal operation of the illustrated injection molding apparatus begins with member 4 in an advanced position with its tip 7 very near the entrance to passage 14 in downstream nozzle 13, as shown in broken lines 7'. As the cycle commences, a nominal pressure of, for example, 100 to 200 psi, is maintained on member 4 by the hydraulic system connected to shaft 5. This back pressure urges the ram toward nozzle 13 while the member 4 is also rotated by the motor connected to the shaft 5, in a direction that causes the helical vane 9 to feed the plastic material toward nozzle 13 and to accumulate downstream of tip 7 the plastic material that passes the head 7, known means making this possible. Simultaneously heat, typically at around 350° F., is applied to the exterior of the barrel 2 by known means, not shown.

The heat and the feed action cause the plastic material to soften or plasticize within passage 3. The accumulating plasticized plastic material downstream of tip 7 overcomes the back pressure exerted by member 4 and causes it to retract away from the nozzle 13 until it reaches a full retracted position as shown in full lines in FIG. 1. At this point in the cycle an injection stroke is executed in which the member 4 is forced forward towards the nozzle 13 to inject the plasticized plastic material through the passage 14 and into a mold cavity, not shown. When the mold cavity is filled, the injection pressure exerted by the member 4 increases rapidly in the passage 3, as to about 25,000 to 30,000 psi. Thereupon, the injection pressure is removed and a constant holding pressure, as on the order of 20,000 psi is maintained on the member 4 to maintain pressure on the plastic material within the mold until substantial solidification occurs. This holding period is followed by a cooling period which allows the material in the mold to fully solidify. During this cooling period, the plasticizing period of the next cycle begins in which the back pressure is applied to member 4 which again is rotated to fill passage 3 with plastic material which becomes heated and plasticized in barrel 2 for the next injection cycle.

It can be seen from the above that the discharge portion of the barrel 2 is subject to substantial heat and to pressure on the order of 20,000 or more psi, in addition to the abrasion effects from the injection stroke of the tip 7. The area of greatest wear and corrosion exists the portion of passage 3 near the discharge end of the barrel encompassing the length of the stroke of tip 7, which typically is equivalent to about three to five times the diameter of the passage 3 at the discharge end of barrel 2. Under high temperature and pressure conditions occurring in this portion of the barrel, the plastic material may react with and deteriorate by corrosion the metal wall of this portion of the passage if it is not formed of materials resistant to such reaction and corrosion.

To withstand these severe conditions, the barrel 2 according to the invention, comprises an inner tubular sleeve 15 rigidly secured to the interior wall 16 of a portion 17 of passage 3 of suitably larger diameter than the remainder of the passage to accommodate sleeve 15, portion 17 and the remainder of the passage as being separated by shoulder 18. This enlarged passage portion is located near the discharge end 19 of the barrel at the portion of the passage that would otherwise be subjected to the severe conditions described above. Sleeve 15 is mounted and secured within the passage portion 17, by a shrink-fitting technique described later.

Figures 2, 3:
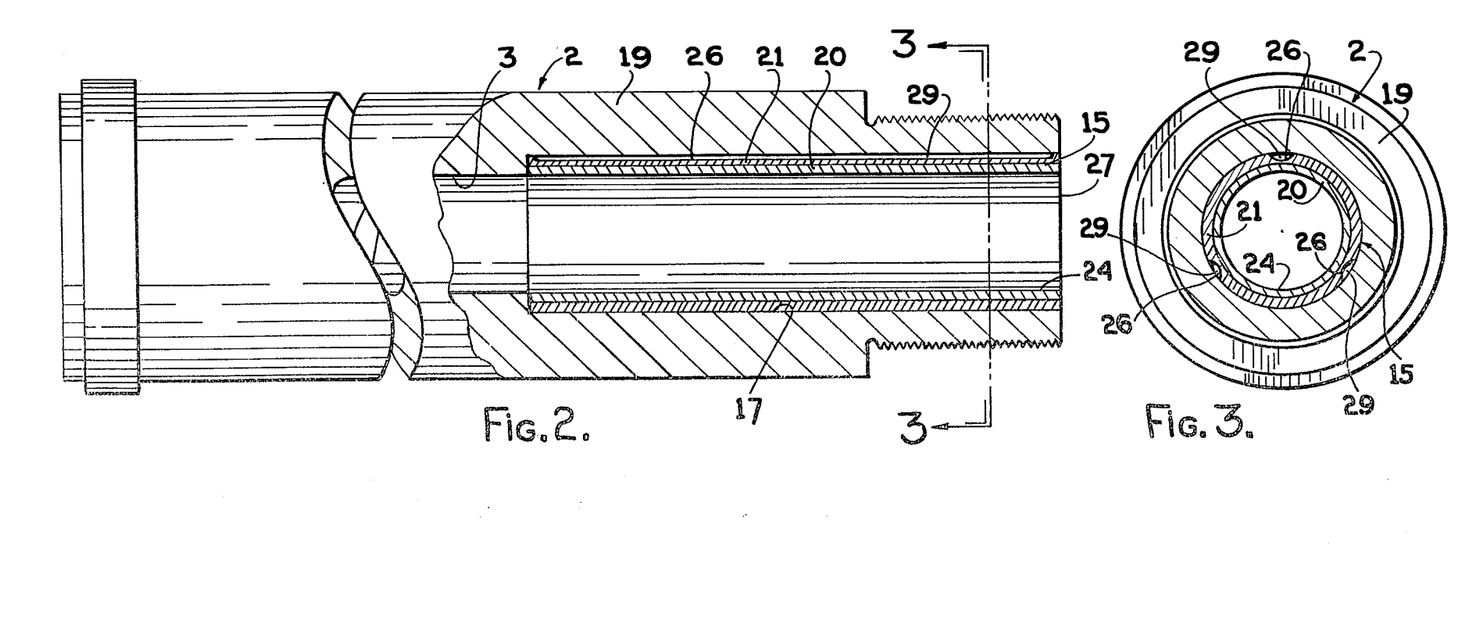
FIG. 2 is a longitudinal elevational view, partially broken away, showing the discharge end of the barrel of FIG. 1, to a larger scale, the threaded removable nozzle portion being omitted in this and succeeding Figures.
FIG. 3 is a section along line 3—3 of FIG. 2.

As shown in FIGS. 2 and 3, sleeve 15 comprises an inner layer 20 and an outer layer 21. Inner layer 20 is made from any suitable known abrasion or corrosive resistant material, preferably metal, and is permanently joined to outer layer 21 which is preferably a tough, ductile metal such as mild steel.

Figures 4, 5:
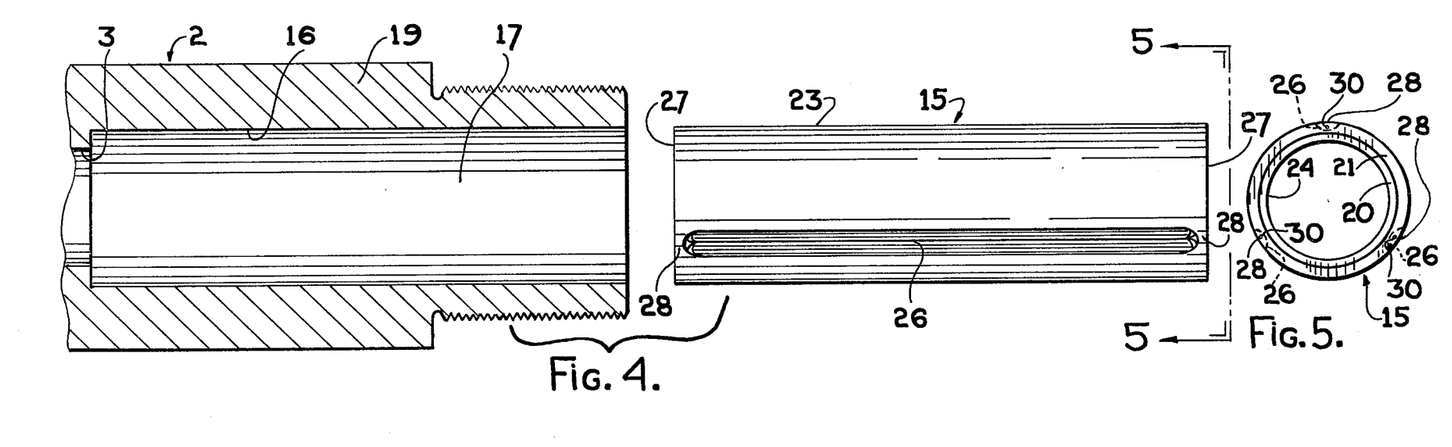
FIG. 4 is a sectional view of the discharge end of the barrel of FIG. 2 and to the same scale, showing the sleeve before insertion into the barrel.
FIG. 5 is an end view of the sleeve from line 5—5 of FIG. 4.

FIGS. 4 and 5 show a sleeve 15 prior to installation of the sleeve in the barrel. This sleeve has a cylindrical exterior surface 23 sized to fit tightly, preferably by a shrink fit, against wall 16 of the enlarged portion 17 of passage 3. It has a cylindrical opening 24 sized to match closely the remainder of passage 3 and to act as a cylinder in which the tip 7 of member 4 can act as a piston or ram portion. This sleeve has three grooves 26 formed in the exterior surface of the sleeve, each groove extending longitudinally or axially of the sleeve. Each groove stops short of either end 27 of the sleeve, so that closure portions or ridges 28 are provided which separate the groove from each end 27 of the sleeve. Consequently, each groove 26 has closed ends as shown in FIG. 5, and there is no access to the cavity 29 formed by the groove and its adjacent portion of wall 16 when the sleeve 15 is in place in the enlarged portion 17 of passage 3 with one of its ends abutting shoulder 18 and its other end accessible from the free end of the barrel 2 as shown in FIG. 2. Because of portions 28, the exterior of each end portion of the sleeve is of uninterrupted cylindrical configuration. The location of the end of each groove with relation to an end of the sleeve 15 is indicated on the end of the sleeve by suitable indicia 30 (FIG. 5) such as indentations made by a suitable tool. These indicia locate where holes should be cut or drilled to provide access to the groove cavities.

In the preferred embodiment of the present invention as depicted in FIGS. 1–10, there are three grooves 26 spaced symmetrically around the exterior of the sleeve 15. However, a greater or lesser number of grooves could be provided. However, more grooves could tend to weaken the sleeve particularly causing difficulties in installation in the housing, and fewer straight grooves could create undesirable asymmetry or cause problems in the removal method described below.

Figures 6, 7:
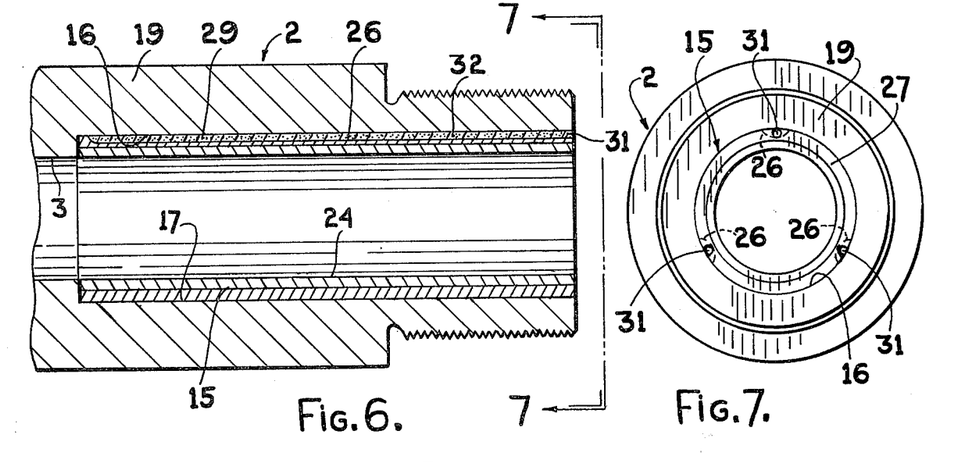
FIG. 6 is a sectional view of the discharge end of the barrel of FIG. 2 prior to removal of the sleeve which has its groove cavities opened at one end and containing explosive material.
FIG. 7 is an end view from line 7—7 of FIG. 6.
Figure 8:
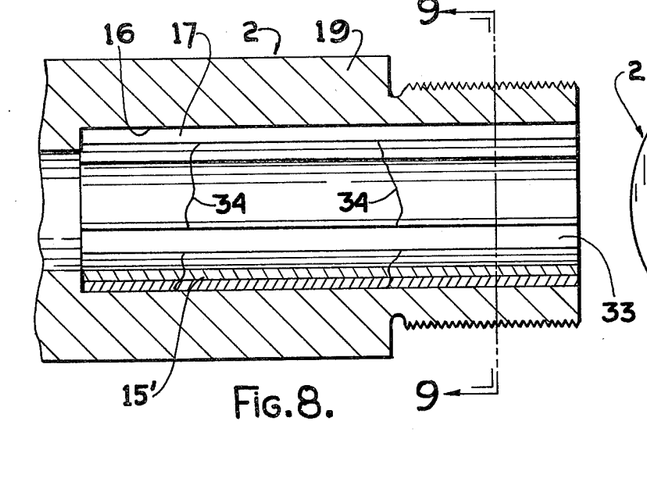
FIG. 8 is a sectional view of the barrel of FIG. 6 after detonation of the explosive material, the collapsed sleeve being still in the barrel.
Figure 9:
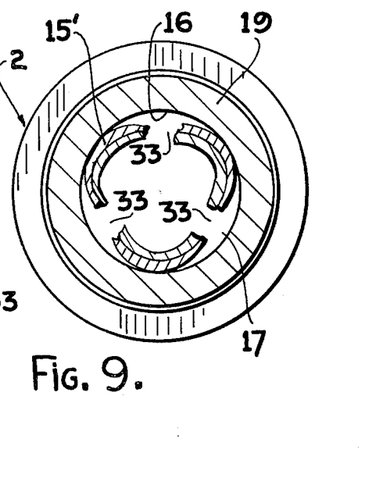
FIG. 9 is a section along line 9—9 of FIG. 8.
Figure 10:
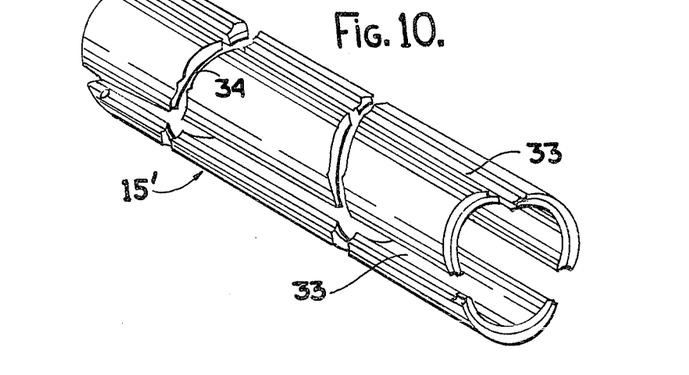
FIG. 10 is a perspective view of the parts of the exploded sleeve of FIGS. 8 and 9 after removal from the barrel.
Figures 11, 12:
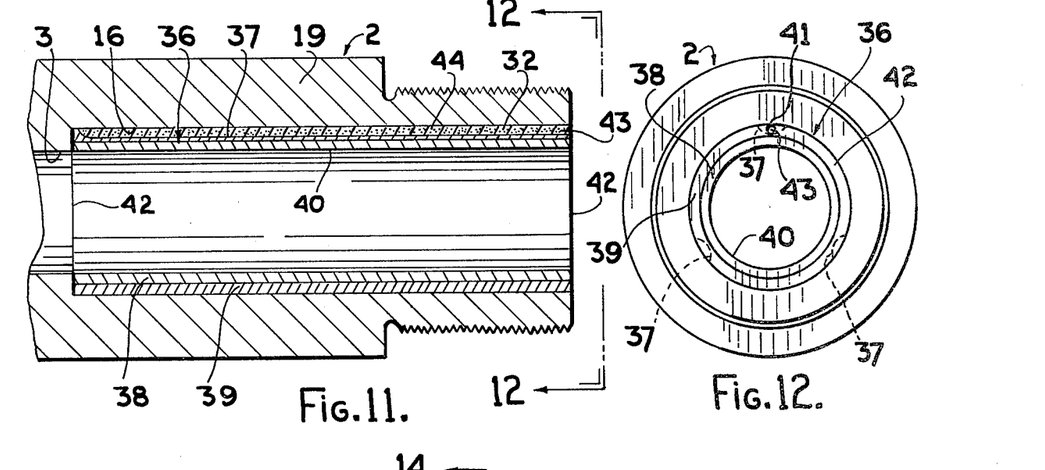
FIG. 11 is a longitudinal sectional view of the discharge end of the barrel prior to removal of another embodiment having a sleeve with a single groove cavity opened and containing explosive material.
FIG. 12 is an end view from line 12—12 of FIG. 11.

The preferred method of removing a worn or otherwise deteriorated sleeve of the present invention from the barrel 2 is depicted in FIGS. 6–10. FIGS. 6 and 7 show the triple grooved sleeve 15 of the preferred embodiment in place in the barrel 2, after three holes 31 have been drilled through the closure portions 28 at the end 27 of the sleeve which is accessible from the free end of the barrel 2. The holes 31 provide access to the groove cavities 29. Each of the groove cavities then has inserted into it a suitable quantity and type of known commercially available explosive material 32, which when detonated by known means, causes the sleeve to collapse internally by failure at the grooves, and usually elsewhere, without damage to the barrel or distortion of passage 3. In the embodiment illustrated in FIGS. 8 and 9, longitudinal fractures 33 occur in the sleeve 15 along the grooves 28 creating at least three pieces of sleeve; usually, additional circumferential features 34 also occur. The collapsed sleeve 15' can be easily removed from the barrel 2, merely by pulling the pieces out. No machining is necessary. The fractured sleeve after removal is shown in FIG. 10; pieces of the sleeve are usually completely separate from each other.

Figure 13:
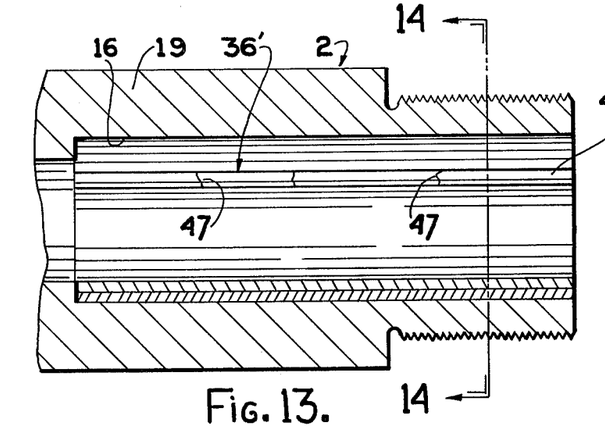
FIG. 13 is a sectional view of the barrel of FIG. 11 after detonation of the explosive material, the collapsed sleeve being still in the barrel.
Figure 14:
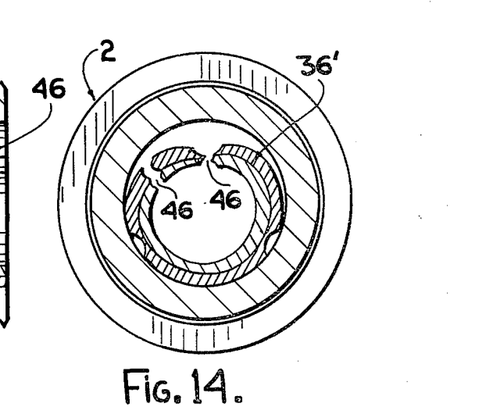
FIG. 14 is a section along line 14—14 of FIG. 13.
Figures 15, 16:
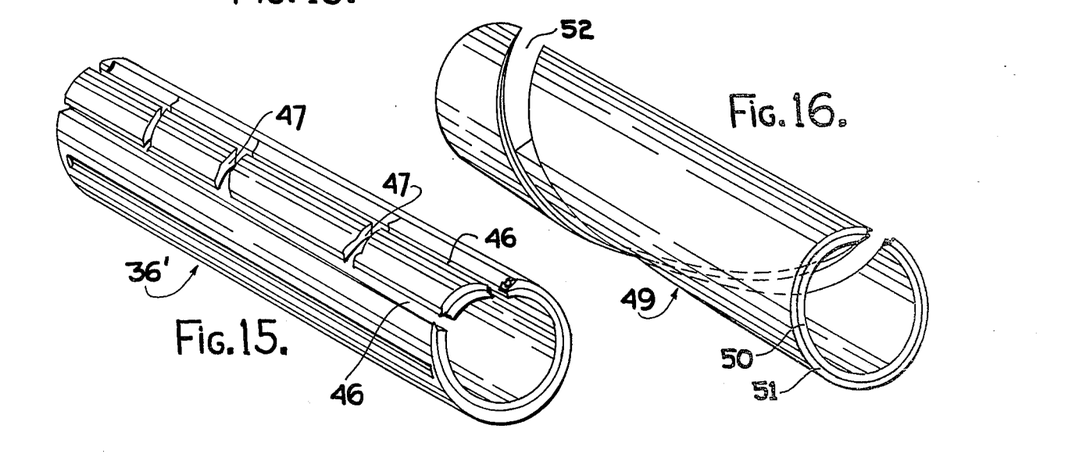
FIG. 15 is a perspective view of the parts of the exploded sleeve of FIGS. 13 and 14 after removal from the barrel.
FIG. 16 is a perspective view of another embodiment of a sleeve with a single helical groove, after explosion and removal from the barrel.

An alternative embodiment is shown in FIGS. 11–15. In this embodiment sleeve 36, which is otherwise similar to sleeve 15, has three grooves 37 extending longitudinally along the exterior of the sleeve, which comprises an inner layer 38 and outer layer 39, defining a passage 40. At least one groove 37 is similar to the groove 26, with a closure portion or ridge 41 formed between each end of the groove and each end 42 of the sleeve. When it is desired to remove the sleeve 36 a single hole 43 (FIG. 12) is drilled through such portion 41 of the sleeve for only one of the grooves 37 of the sleeve while it is located in opening 17 against wall 16 in barrel 2, to provide access to the cavity 44 formed by groove 37 and wall 16 of the barrel. This cavity has explosive material 32 inserted as before, and the explosive material is detonated to cause failure of the sleeve 36, typically with longitudinal fractures 46 and circumferential fractures 47 (FIGS. 13, 14). As a result of these fractures in the sleeve, the fractured sleeve 36' can be readily removed from barrel passage portion 17 of barrel 2 merely by pulling it out. The removed sleeve 36' is shown in FIG. 15. While this alternative method results in less fracture of the sleeve and thus might make the sleeve slightly more difficult to remove after fracture, it has the advantage of using somewhat less explosive and requiring somewhat less time for drilling the single access hole to a single groove and inserting explosive.

Another alternative embodiment of the present invention is illustrated by FIG. 16. In this embodiment, a single helical groove is formed on the exterior of a sleeve 49 that comprises inner layer 50 and outer layer 51 and except for the groove is otherwise the same as sleeve 15 of the first embodiment. The ends of the helical groove do not extend to the ends of the sleeve creating closure portions or ridges that block access to the cavity formed by the groove when the sleeve is in place in a barrel 2. As in the previous embodiments, to obtain access to the groove cavity, a small hole is drilled through the closure portion to the end of the groove accessible from the free end of the barrel, the end of the groove being indicated by a suitable indicia on the end of the sleeve to locate the hole. The cavity then has explosive material inserted and detonated, creating a fractured sleeve 49 as shown in FIG. 16. A single helical fracture 52 typically occurs along the length of the helical groove. The sleeve can then be easily removed by being pulled out of the barrel 2, without machining. The helical groove extending at least substantially completely around the sleeve prevents it from distorting upon detonation to the extent that it cannot be easily removed.

In each illustrated embodiment of the invention, after the worn or otherwise deteriorated sleeve has been removed using the explosive process described, a new sleeve can be easily installed, preferably by using a shrink-fitting process. According to a preferred process, the barrel 2 is heated, at least at the portion 19 in which the sleeve is to be inserted, to cause the diameter of passage portion 17 to increase; the sleeve is cooled, as by exposure to solid carbon dioxide, to cause its exterior diameter to decrease. The sleeve is then inserted into passage portion with one end against shoulder 18, and the temperatures of the barrel and sleeve allowed to equalize. This causes the sleeve to be firmly held in the barrel, by forces directed inwardly on the sleeve. However, when the sleeve is subjected to outwardly directed forces from the pressure of the plastic material in the sleeve during the injection molding operation, these forces oppose the radially inwardly directed forces sufficiently to reduce substantially the stress in the sleeve caused by the shrink fit, so that the strength of the sleeve is increased during the molding operation.

In such a process, the inner and outer layers of which the sleeve is composed may tend to contract and expand at different rates from the thermal effects. The stresses resulting from such differences in thermal contraction and expansion, together with the stresses already present in the sleeve from the original joining of the inner layer to the outer layer, could tend to crack the grooved sleeve in the absence of the following features. To avoid such cracking, the location and configuration of each external groove is critical. The presence of the closure portion at each end of each groove provides necessary structural support to the sleeve and avoids cracking failure or other failure of the sleeve due to insertion, cooling, raising of the temperature and operation of the molding machine. While the presence of the closure portion at each end of the groove is thus important in preventing weakness and cracking of the sleeve, a sufficiently narrow closure portion preferably is also provided to permit it to be easily drilled through to create the hole necessary for access to the groove cavity and permitting insertion of explosive material and in practicing the removal process of the present invention.

It is also important that each groove be of sufficient cross sectional size to permit insertion into the groove of sufficient explosive material to provide the desired fracturing action on the sleeve. However, the groove should not be so deep or wide as to weaken the sleeve so it can become damaged on insertion into the barrel, or as to impair the ability of the sleeve to be firmly held in the barrel or housing after installation and during use of the barrel, or as to prevent proper action of the sleeve in providing an abrasion and wear-resistance, and if desired, corrosion resistance. In the illustrated embodiments, the grooves do not extend into the inner wear resistant inner layer of the multilayer sleeve illustrated; preferably, as shown, the groove does not extend completely through the outer layer of the sleeve, to increase the strength of the sleeve before and during insertion into the barrel. However, the groove or grooves should be of sufficient cross sectional size and depth, and of sufficient length, to permit introduction of the proper amount of explosive material to collapse the sleeve internally of the barrel on detonation of the explosive material, and to provide a zone of lesser strength to permit ready fracture and collapse of the sleeve throughout its length on detonation of the explosive material so the sleeve can be easily removed from the barrel.

It is also preferable that if a plurality of grooves are used, they be spaced symmetrically about the exterior of the sleeve since asymmetrical spacing of the grooves could result in sleeve warpage on cooling and heating of the sleeve. This could result in undesirable effects during the shrink-fitting insertion of the sleeve. Furthermore, unnecessary and undesirable stresses could be created if the grooves are placed asymmetrically about the exterior of the sleeve. It is preferable to have at least three grooves in the sleeve.

The invention thus provides apparatus providing in a housing at a portion of a passage that would otherwise be subjected to severe conditions that could deteriorate the wall of the passage in that portion, a readily replaceable sleeve that is formed of material that is highly resistant to such conditions. The invention also provides effective, rapid, simple and inexpensive method of removal and replacing such sleeve. Important savings are possible because the sleeve which may be formed of expensive material, is used only where the severe conditions require resistance by the metal of the sleeve, and because the sleeve can be manufactured with only little machining, and can be removed and replaced with no machining.

While the invention has been shown with specific application to the barrel or housing of an injection molding machine, it is understood that it may have applications in other situations in which housings for elongated openings or passages are subject to severe conditions, such as abrasion, heat, pressure, wear, or corrosion. For example, the sleeve and process of the present invention may be employed advantageously in pumps or conduits which conduct highly corrosive or abrasive materials, in addition to the disclosed employment in injection or extrusion machines for plastic materials.

Various modifications other than those indicated above may be made in the apparatus and methods of the invention. Thus, the sleeve need not be made of multi-layer construction, but may be made entirely of a single metallic or non-metallic material, preferably of a material resistant to severe conditions to which the inner wall of the sleeve may be subjected, such as abrasion, wear, or corrosion. Moreover, while the sleeve has been indicated as being of cylindrical configuration, it may be of any of a variety of other configurations, and even of non-circular cross section, depending on the application in which it is to be used. However, sleeves of circular cross section are preferable, for reasons discussed above in connection with providing strength at the ends of the sleeve before and during insertion of the sleeve into its housing. Furthermore, other means may be used than that discussed above for locating the end of a groove at the end of the sleeve to permit cutting a hole through the closure portion to provide access to the groove cavity; for example, the location of the groove end can be identified by other techniques such as those employing ultrasonics, magnetism, or electrical conductivity.

While the present invention has been disclosed with respect to specific embodiments thereof, these are intended for the purposes of illustration rather than limitation. It will be obvious to those skilled in the art to which this invention pertains that various modifications and changes to the preferred embodiments in addition to those shown, described, and discussed herein, may be made without departing from the spirit and scope of this invention.

I claim:

1. In combination, a rigid housing for receiving a sleeve having an elongated opening the surface of which is subject to severe conditions in use, a portion of the housing having an elongated aperture surrounded by a substantially thick wall, said aperture having a cross section larger than the cross section of said sleeve opening; said sleeve having the surface of said opening formed of material resistant to said severe conditions, said sleeve being inserted and fixed without bonding within said aperture of said housing and having at least one groove formed in and extending uninterruptedly along the exterior of the sleeve substantially throughout its length but terminating short of an end thereof to form an ungrooved end portion, said groove defining with the adjacent portion of said aperture wall an elongated cavity between said sleeve and said aperture wall that is closed throughout the length of the groove and that is capable of having explosive material inserted into said cavity substantially throughout its length, the relative strengths of said sleeve and said housing and the cross section of said groove being such that when said explosive material in said cavity is detonated said sleeve fractures at said groove and collapses inwardly of said aperture without injury to said housing to permit ready removal of the collapsed sleeve from said aperture in said housing.

2. Apparatus as in claim 1, wherein the sleeve has a plurality of said grooves formed in and positioned generally symmetrically about the exterior of the sleeve and forming a plurality of said cavities.

3. Apparatus as in claim 1, in which said sleeve comprises an inner layer of material resistant to such severe conditions and fixed to an outer layer of material that contacts said aperture wall in said housing which outer layer is fixed against said aperture wall within said housing portion.

4. Apparatus as in claim 1 in which said groove is substantially straight and extends longitudinally of the exterior of said sleeve.

5. Apparatus as in claim 1 in which the groove extends longitudinally along the exterior of the sleeve substantially throughout its length and in which there is a closure portion between at least one end of said sleeve and said groove that is accessible from an exterior end of said housing to permit a portion of said closure portion to be removed to provide an opening into said cavity through which explosive material can be inserted into said cavity substantially throughout its length.

6. Apparatus as in claim 4 in which there are a plurality of said grooves spaced around the exterior of said sleeve.

7. The apparatus of claim 6 in which there are three of said grooves substantially equiangularly spaced around said sleeve.

8. Apparatus as in claim 1 in which said groove extends generally helically around the exterior of said sleeve substantially throughout its length, in which there is a closure portion between at least one end of the sleeve and said groove that is accessible from an exterior end of said housing to permit a portion of said closure portion to be removed to provide an opening into said cavity through which explosive material can be inserted into said cavity substantially throughout its length.

9. Apparatus as in claim 1 in which the groove extends helically substantially entirely around the exterior of the sleeve.

10. Apparatus as in claim 1 in which said sleeve is fixed in said aperture by a tight fit of the exterior of said sleeve against said wall of said aperture.

11. The apparatus of claim 1 in which said sleeve for at least a portion of the thickness of said sleeve outwardly from said opening through said sleeve is made of wear resistant material.

12. The apparatus of claim 1 in which said housing comprises a portion of a discharge barrel for plastic material, and in which said opening in said sleeve is a portion of an elongated cylinder opening in said barrel; said apparatus comprising a piston moving longitudinally of and in said cylinder opening to eject from said cylinder opening plastic material in said cylinder opening.

13. The apparatus of claim 1 in which said sleeve has a plurality of said grooves.

14. The apparatus of claim 1 in which said aperture and said sleeve while in said aperture are located so said opening in said sleeve is part of a passage in said housing, and said sleeve is located so its opening is subjected to said severe conditions.

15. The apparatus of claim 1 in which said sleeve has, at its end accessible from the exterior of said housing, a closure portion at the end of said groove through which an opening can be cut for insertion of said explosive material, and indicia means indicating the location of said end of said groove to indicate where the opening is to be cut.

16. In combination, a rigid housing for receiving a tubular sleeve having an elongated cylindrical opening subject to abrasion or wear, which housing has a portion having an elongated cylindrical aperture surrounded by a substantially thick wall, said aperture having a diameter larger than the diameter of said opening; said tubular sleeve having an external cylindrical surface of a size and shape such that it fits tightly within said cylindrical aperture without bonding, said sleeve having at least one groove formed in and extending uninterruptedly along the exterior of said sleeve substantially throughout its length but terminating short of an end thereof to provide a closure portion between said end of the groove and the associated end of the sleeve accessible from an exterior end of said housing, said groove and the adjacent inner wall of said aperture forming an elongated cavity between said sleeve and said aperture wall that is closed throughout the length of the groove and that is capable of having explosive material inserted into the cavity substantially throughout its length after an opening has been formed through said closure portion, the relative strengths of said sleeve and said housing and the cross section of said groove being such that when said explosive material in said cavity is detonated said sleeve fractures at said groove and collapses inwardly of said aperture without injury to said housing to permit ready removal of the collapsed sleeve from said aperture in said housing.

17. The apparatus of claim 16 in which said sleeve has an ungrooved end portion at each end of the sleeve and both said end portions of said sleeve are of uninterrupted external cylindrical configuration and in which sleeve said groove is located between said end portions of said sleeve and terminates short of said end portions of said sleeve so that said end portions provide closure portions at the opposite ends of said groove, one of said closure portions being located at an end of said sleeve accessible from an exterior end of said housing and adapted to permit a portion of said closure portion to be removed to provide an opening into said cavity through which explosive material can be inserted into said cavity substantially throughout its length.

18. The apparatus of claim 17 in which said sleeve has a plurality of said grooves extending longitudinally thereof and generally parallel to the axis of said sleeve.

19. The apparatus of claim 18 in which said plurality of grooves are substantially equiangularly spaced around the exterior of said sleeve.

20. The apparatus of claim 17 in which there are three of said grooves substantially equiangularly spaced around said sleeve.

21. The apparatus of claim 16 in which said sleeve has an end portion at each end of the sleeve and both end portions of said sleeve have external cylindrical surfaces and said groove extends substantially throughout the length of said sleeve between said cylindrical end portions of said sleeve.

22. The apparatus of claim 16 in which said sleeve has, on its end accessible from the exterior of said housing, indicia means indicating the location of the adjacent end of said groove, to make possible the formation of said last mentioned opening at the proper location through said closure portion.

23. The apparatus of claim 14 in which said housing comprises a portion of a discharge barrel for plastic material, and in which said opening in said sleeve is a portion of an elongated cylinder opening in said barrel; said apparatus comprising a piston moving longitudinally of and in said cylinder opening to eject from said cylinder opening plastic material in said cylinder opening.

* * * * *